Aug. 15, 1944. A. L. BAKER 2,355,774
APPARATUS FOR CONVEYING PULVERIZED MATERIAL
Filed Nov. 29, 1941 2 Sheets-Sheet 2

INVENTOR.
ALBERT L. BAKER
BY Virgil F. Davis
William Klabunde
ATTORNEYS

Patented Aug. 15, 1944

2,355,774

UNITED STATES PATENT OFFICE 2,355,774

APPARATUS FOR CONVEYING PULVERIZED MATERIAL

Albert L. Baker, Summit, N. J., assignor, by mesne assignments, to Fuller Company, Catasauqua, Pa., a corporation of Delaware Application November 29, 1941, Serial No. 420,991

7 Claims. (Cl. 302—50)

This invention relates to apparatus for conveying finely pulverized material through a conduit system. The present invention is in the nature of an improvement in the operation of pumps of the general type disclosed in U. S. Letters Patent No. 1,553,539, granted to A. G. Kinyon.

Screw-conveyors of this type are employed for transporting comminuted material through a conduit system, utilizing the phenomenon that dry, finely pulverized material, when thoroughly mixed with a limited quantity of air or other gas, becomes highly fluent or liquid.

The usual practice is to advance the comminuted material through a casing by means of a rapidly rotating screw which compacts the material as it advances. Adjacent the delivery end of the screw, compressed gas is injected into the stream to aerate the material. In some of the devices the compacting action of the screw results in the formation of a plug, or area of increased density, which forms a seal against preaeration of the pulverized material in the conveyor screw due to blow-back of the gas into the conveyor casing.

It has been found that the apparatus and methods above referred to do not operate equally well with all materials and under all conditions. Particularly lacking in many of the present devices has been a satisfactorily uniform discharge at the delivery end of the screw conveyor immediately preceding the point of aeration. A principal object of my invention, therefore, is to provide improved conveying apparatus of the character described for advancing comminuted material, in which the compacted material is constantly fed in a condition of uniform density to the point of aeration.

Check-valve mechanisms at the discharge end of the conveyor are commonly employed as a safeguard against blow-back. Another object of my invention is to provide an improved check-valve mechanism which, acting in conjunction with the various other improvements will enable the conveyor of the present invention to operate efficiently under varying conditions of pressure from either direction.

The further objects and advantages of my invention will become apparent from a consideration of the following specification and claims taken in connection with the accompanying drawings forming a part of this application, in which:

Figure 1:
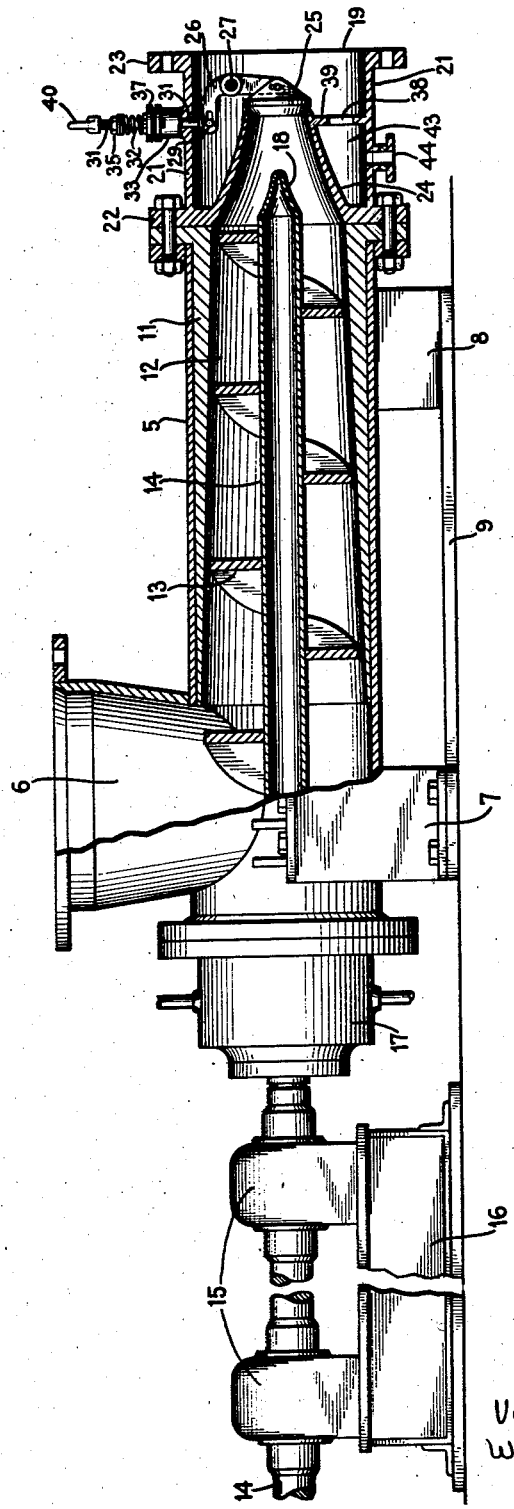
Fig. 1 is an elevation, in section, of the conveying apparatus.

In the drawings, the main conveyor casing 5, having an inlet hopper 6 for the comminuted material, is shown horizontally mounted on supports 7 and 8 resting on a bed-plate 9.

Casing 5 has a liner 11 having a bore 12 of decreasing diameter. A conveyor screw 13, of decreasing diameter comparable with the decrease in bore 12 is mounted on a hollow shaft 14 which extends within the casing 5. The shaft 14 of conveyor screw 13 projects substantially beyond the inlet end of the casing 5, being supported for rotation in spaced bearing blocks 15 resting on a pedestal 16. The end of shaft 14 connects, through a suitable coupling arrangement, with a source of motive power, neither of which has been shown.

Between bearings 15 and casing 5 a conventional form of water-cooled jacket and dust seal is provided, encased in housing 17 secured to the end of casing 5. The free end of the screw portion of shaft 14 extends beyond the end of casing 5, tapering inwardly. The tapered portion is provided by a cap 18 attached, as by welding, to the end of the hollow shaft. The cap forms a smooth joint with the end of the hollow shaft.

Removably attached to the end of casing 5 is a manifold 19 containing the check-valve mechanism. Manifold 19 comprises a main cylindrical body portion 21 having flanged ends 22 and 23 by which it may be connected to the conveyor casing and to the conduit through which the pulverized material is to be pumped. Flange 22 extends also radially inwardly from the cylindrical body portion 21 to form a circular opening coinciding with the narrow end of bore 12. The inner flange portion supports the base of a nozzle 24 having the curved form of the approach portion of a venturi and extending longitudinally within the cylindrical portion 21. Tapered plug 18 extends within the nozzle 24, the plug and the nozzle supplementing each other to reduce the flow area of the stream of material passing through the nozzle so as to produce a partial Venturi section.

The check-valve 25 is pivotally attached to one end of a bell-crank 26 rotatably mounted by means of horizontal shaft 27, the ends of which are supported in lugs 28 projecting inwardly from the walls of the cylindrical body portion 21 of manifold 19. The other end of bell-crank 26 is slotted to receive a pivot pin 29, by which it is attached to the lower end of a vertical plunger 31. Plunger 31 is adapted to slide downwardly against the action of a compression spring 32 in a vertical guideway drilled in a flanged boss 33 formed on top of portion 21. The upper drilled portion of the boss 33 is radially recessed to receive a packing ring 34. The upper end of plunger 31 is threaded to receive an adjustment nut 35. Compression spring 32 acts against a washer 36 placed below adjustment nut 35 and a spring seat 37 bolted to the flange on boss 33 and forming a cover to retain the packing ring 34 in its recess. Spring 32 normally holds the plunger 31 up and the valve 25 against its seat on the mouth of nozzle 24. By means of adjustment nut 35, valve 25 is made to operate under certain predetermined conditions of pressure in the conveyor and the conduit into which it discharges. A handle 40 on the threaded end of plunger 31 permits hand operation of the valve.

The pulverized material fed into hopper 6 is advanced by the rapidly rotating feed-screw through the reduced portion of the casing. The material is not only compacted, but its velocity is materially increased. This nozzle arrangement eliminates a plug seal of densely compacted material. In other words, instead of a physical barrier or static seal as a precaution against blow-back, a velocity seal is provided. The high velocity discharge prevents blow-back under normal operating conditions.

Figure 2:
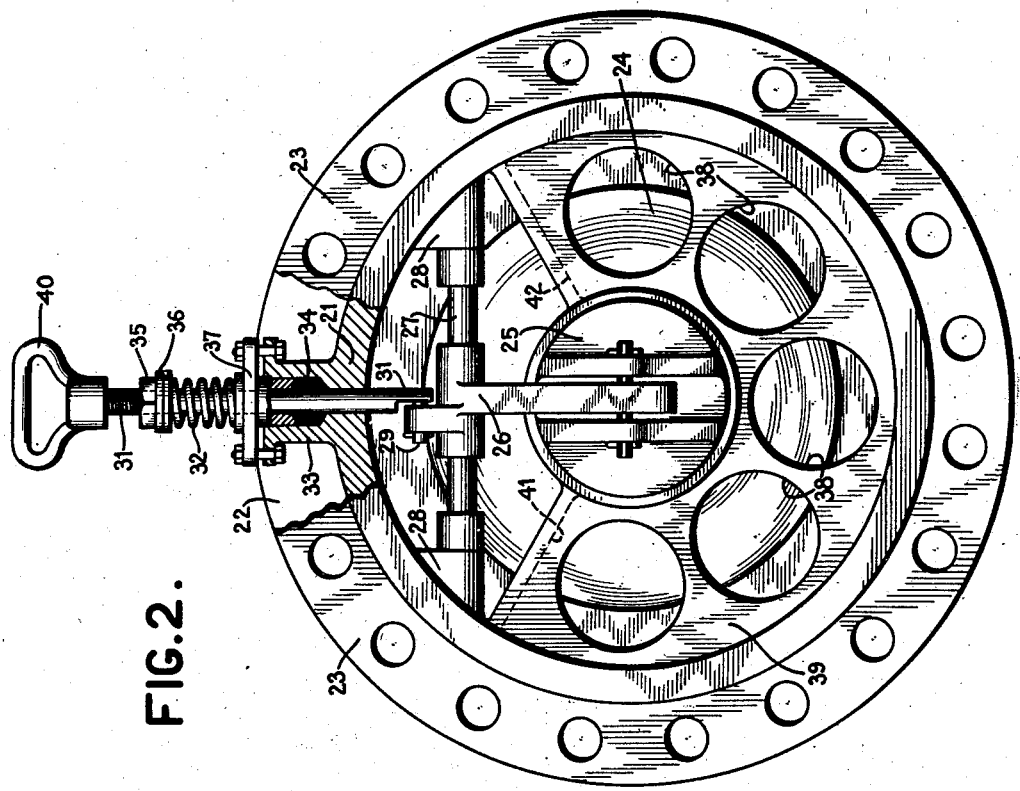
Fig. 2 is an enlarged end view showing clearly the construction and location of the check-valve mechanism.

As the pulverized material leaves nozzle 24 it is charged with a stream of gas supplied through openings 38 in wall 39. Wall 39 extends radially between the walls of portion 21 and nozzle 24, closing the major portion of the space between the body and nozzle portions of the manifold 19, as clearly shown in Fig. 2. Longitudinal wall segments 41 and 42 extend backwardly from the upper edges of wall 39 to form a sealed gas chamber 43 in the lower part of the manifold whose only outlet is through the openings 38. Gas is supplied to chamber 43 through an inlet nozzle 44 connected to a source of compressed gas, not shown.

I claim:

1. In a conveyor for pulverized material in which the material is aerated to produce a condition of fluidity, a casing having an inlet for material to be conveyed, a rotatable screw for advancing material through said casing, a manifold on the discharge end of said casing having an aerating chamber with a Venturi-shaped inlet passage for receiving material advanced by said screw, the end of said screw projecting within the mouth of said passage and having an end taper complementing the curvature of said inlet passage to produce a dense, high-velocity stream of said material discharging uniformly into said aerating chamber, a check-valve within said chamber cooperating with the discharge end of said inlet passage to restrict the flow of material therethrough, and means for aerating said material as it emerges from said passage.

2. In a conveyor for pulverized material in which the material is aerated to produce a condition of fluidity, a casing having an inlet for material to be conveyed, a rotatable screw for advancing material through said casing, said casing and said screw being tapered to increase the density and velocity of the material being advanced, a manifold on the discharge end of said casing having an aerating chamber with a Venturi-shaped inlet passage for receiving material advanced by said screw, the end of said screw projecting within the mouth of said passage and having an end taper complementing the curvature of said inlet passage to produce a dense, high-velocity stream of said material discharging uniformly into said aerating chamber, a check-valve within said chamber cooperating with the discharge end of said inlet passage to restrict the flow of material therethrough, and means for aerating said material as it emerges from said passage.

3. In a conveyor for pulverized material in which the material is aerated to produce a condition of fluidity, a casing having an inlet for material to be conveyed, a rotatable screw for advancing material through said casing, a manifold on the discharge end of said casing having an aerating chamber with a Venturi-shaped inlet nozzle projecting therein for receiving material advanced by said screw, the larger end of the nozzle passage coinciding with the discharge end of said casing, the end of said screw projecting within the mouth of said passage and having an end taper complementing the curvature of said inlet passage to produce a dense, high-velocity stream of said material discharging uniformly into said aerating chamber, a check-valve within said chamber cooperating with the discharge end of said inlet passage to restrict the flow of material therethrough, and means for aerating said material as it emerges from said passage.

4. In a conveyor for pulverized material, a casing having an inlet for material to be conveyed, a feed-screw for advancing the material through said casing, a manifold on the discharge end of said casing having an aerating chamber with a Venturi-shaped inlet passage for receiving material advanced by said feed-screw, means within said inlet passage and cooperating therewith to produce a dense, high-velocity stream of said material discharging uniformly into said aerating chamber, check means within said chamber including a closure for the discharge end of said inlet passage, said closure acting to seal the end of said inlet passage during periods of non-discharge, and means for aerating said material as it leaves said inlet passage.

5. In a conveyor for pulverized material, a casing having an inlet for material to be conveyed, a feed-screw for advancing the material through said casing, a manifold on the discharge end of said casing having an aerating chamber with a Venturi-shaped inlet passage for receiving material advanced by said feed-screw, means within said inlet passage forming a restricted area therein to produce a dense, high-velocity stream of said material discharging uniformly into said aerating chamber, and check means within said chamber including a closure for the discharge end of said inlet passage, said closure acting to seal the end of said inlet passage during periods of non-discharge.

6. In a conveyor for pulverized material wherein the material is progressively fed into a casing and conveyed therethrough by a feed-screw which discharges the material at a high velocity from the casing into a chamber, a nozzle attached to the discharge end of said casing and tapered inwardly to form a Venturi-shaped passage which provides a decreasing flow area for material passing from the casing into the chamber, and a feed-screw within said casing having its forward end projecting within said nozzle, the forward end of said feed-screw being tapered complementary to said nozzle, whereby a substantially uniform flow of pulverized material is provided through said nozzle substantially free of eddies and having sufficient velocity to provide a seal against blow-back of said material into said casing.

7. In a conveyor for pulverized material, a casing having an inlet for material to be conveyed, a feed-screw for advancing material through the casing, an outlet for the material from the casing, the outlet providing a discharge passage of decreasing cross-section area effective to cause the material to issue uniformly from the outlet in a dense, high-velocity stream, a chamber into which the material issuing from the outlet is received, means for aerating the material within the chamber, and check means within the chamber acting against the force of said stream of material to restrict the issuance thereof from said outlet, and effective during periods of non-discharge to prevent a return flow therethrough.

ALBERT L. BAKER.